March 22, 1960
J. K. GODBEY
2,929,455
FLOW DIVERTER FOR BORE HOLES
Filed March 26, 1956
5 Sheets-Sheet 1
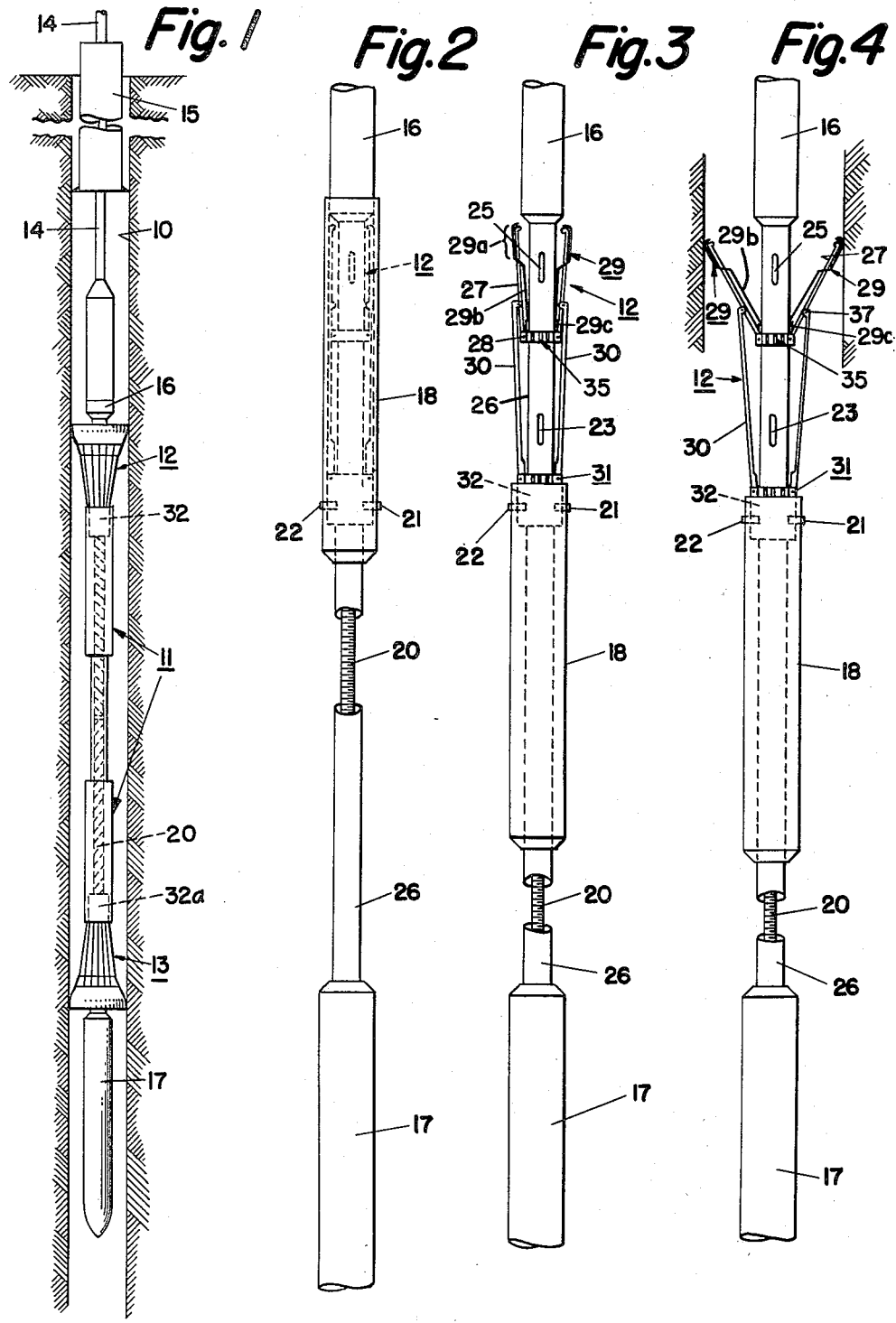

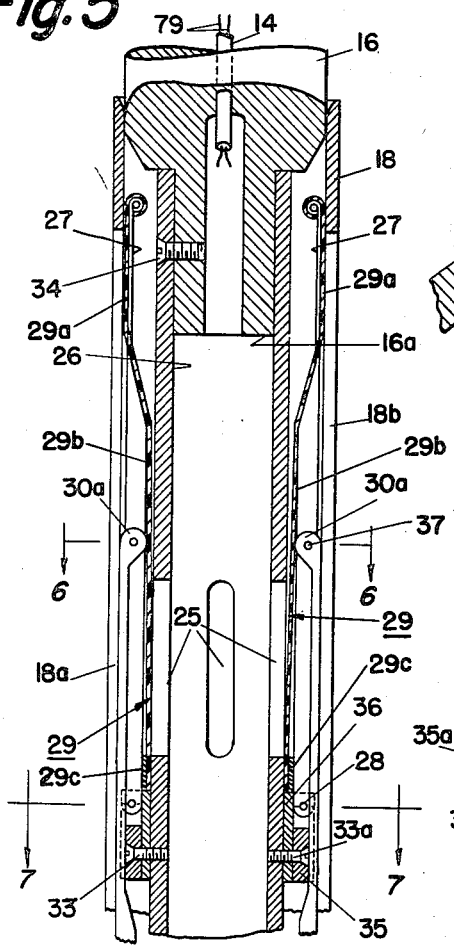

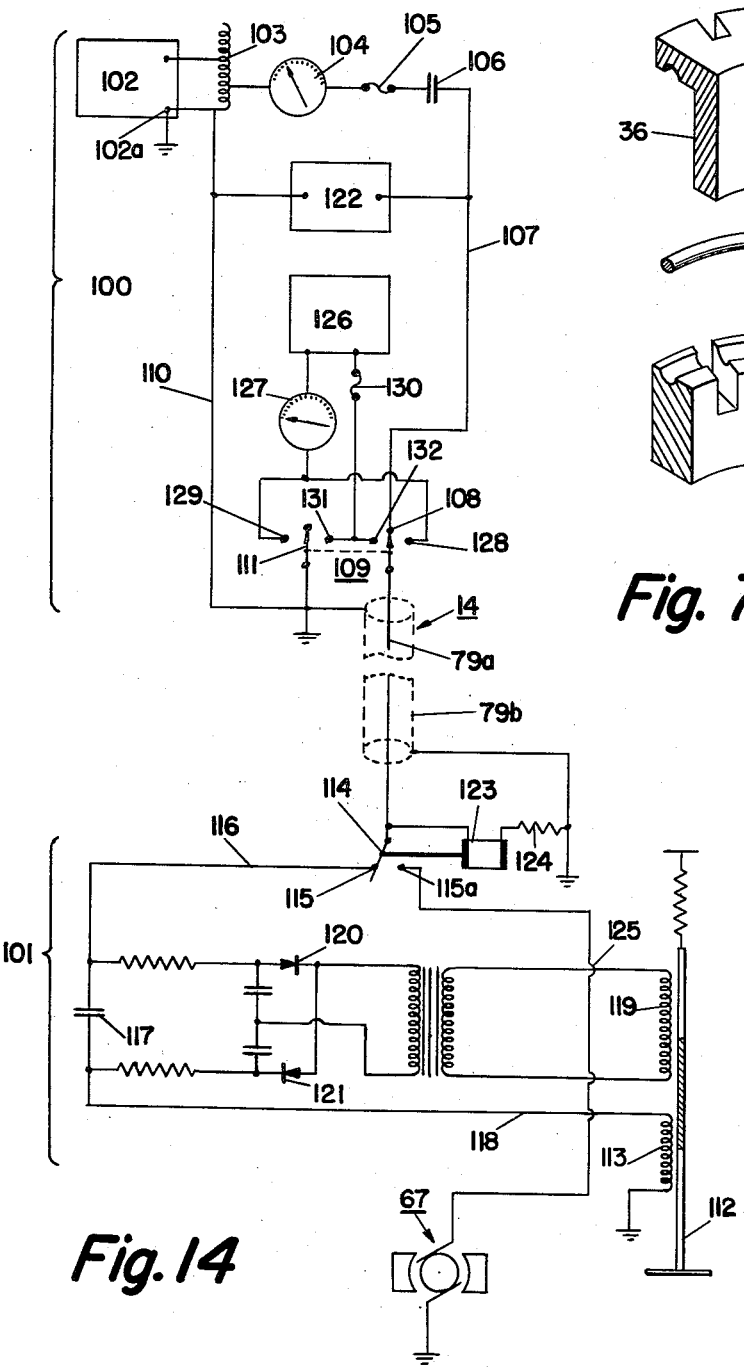
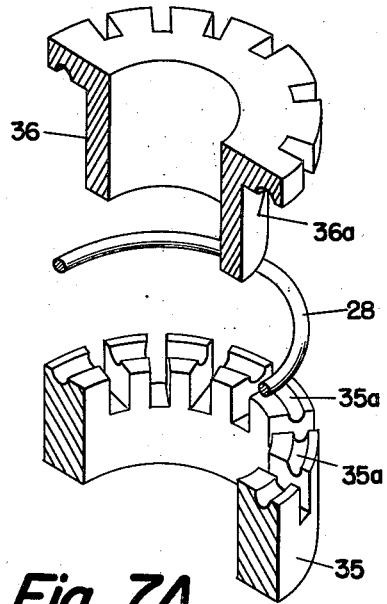
Fig. 7A
Fig. 14

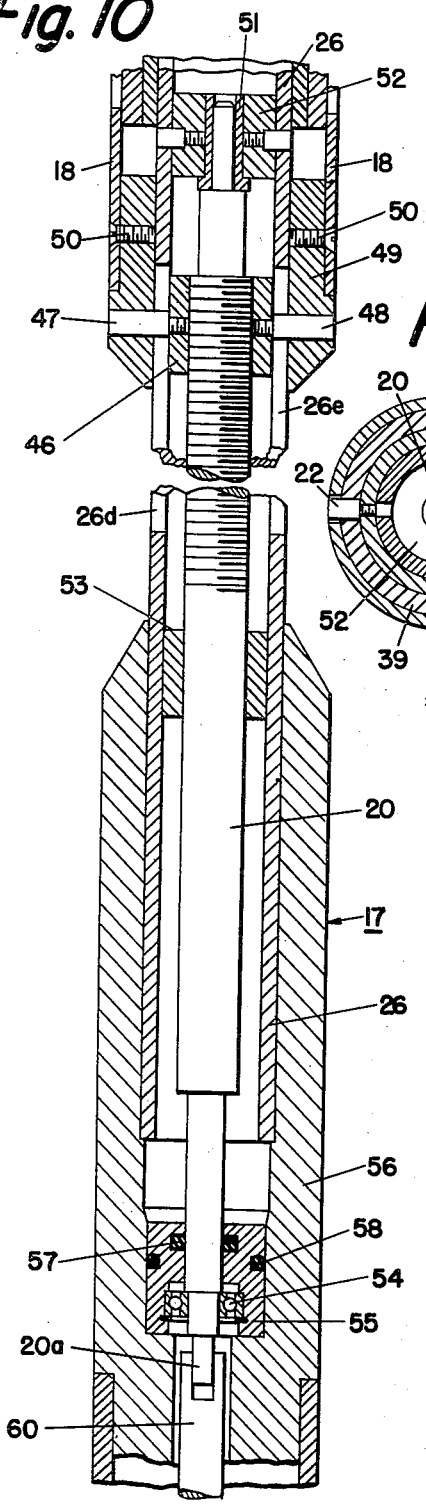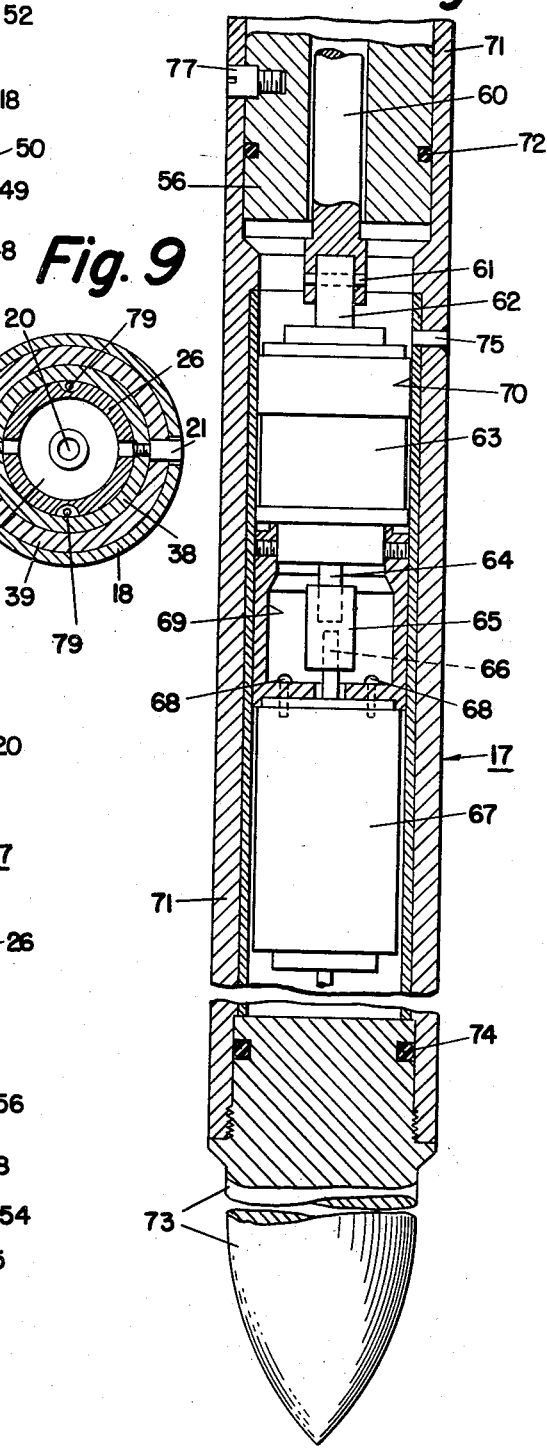

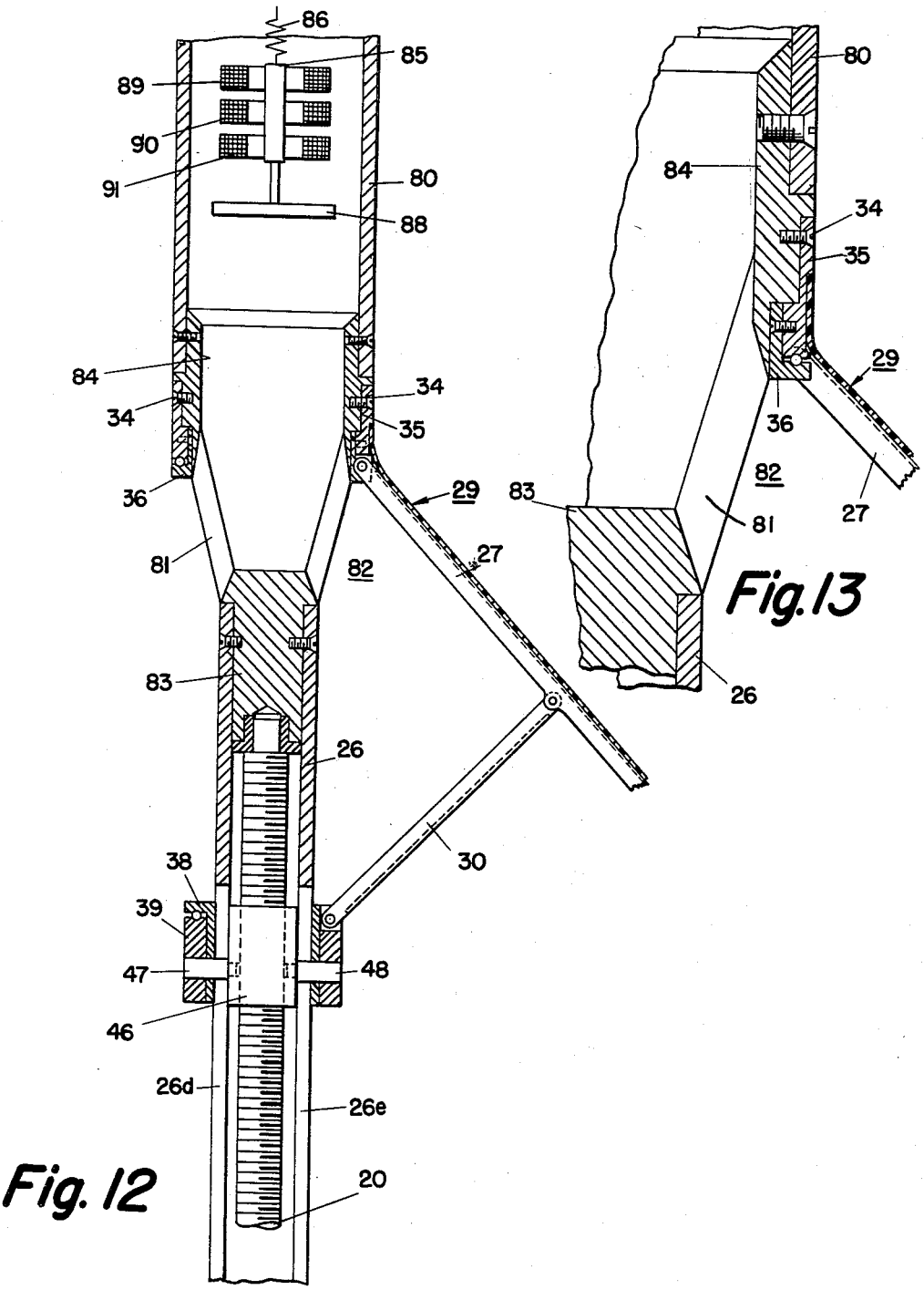

United States Patent Office 2,929,455
Patented Mar. 22, 1960

2,929,455

FLOW DIVERTER FOR BORE HOLES

John K. Godbey, Dallas, Tex., assignor, by mesne assignments, to Socony Mobil Oil Company, Inc., New York, N.Y., a corporation of New York Application March 26, 1956, Serial No. 573,929

10 Claims. (Cl. 166—202)

This invention relates to the measurement of fluid flow in a passage, and more particularly to a flow diverter adapted for use in well bores to restrict the flow of fluid therein to selected locations.

It is a common practice to conduct surveys of well bores to determine the depth-locations of strata into or out of which fluid flows, as well as to measure the amount of fluid entering or leaving such strata. In connection with such surveys, packing assemblies of one kind or another have been utilized to control fluid flow in a measuring system such as a flow meter. Due to flanges between the pipe lengths forming the well casing, and unevenness and projections within the well bore below the casing, the packing assemblies are subjected to great abrasion upon movement of the flow meter from one position to another. While it has been proposed that such packing assemblies be of the type which can be expanded and retracted, much has been left to be desired in providing the protection needed for satisfactory long life of the packing assemblies and in providing packing assemblies which are sufficiently effective upon expansion to prevent loss of fluid between the contacting walls of the packing assembly and of the well bore or casing.

In accordance with the present invention there is provided in a flow measuring system a combination which comprises an elongated member having a fluid flow channel with inlet and outlet ports at spaced points. A flexible diaphragm is secured at one end to the exterior of the elongated member intermediate the ports. Opening and closing structure is pivotally secured to the elongated member and attached to the diaphragm at the opposite end. The opening and closing structure is actuated by an elongated tube slidably mounted about the elongated member and coupled to the opening and closing structure. The elongated tube is moved by suitable means from a first position where it completely encompasses in protective fashion the diaphragm and the opening and closing structure to a second position where the diaphragm is exposed and the structure is actuated to open the diaphragm.

In carrying out the present invention in a preferred form thereof, an exploring unit adapted or use with a flow meter assembly has associated with it one or more flow diverters or packing assemblies characterized by the provision of a plurality of ribs actuated from a folded to an unfolded position by means of a motor forming a part of exploring unit. The motor is arranged positively to actuate the rib-assembly by axial movement of an enclosing housing from a position in which it encloses the rib-assembly and the sealing material carried thereby to provide complete protection of such material against abrasion during movement of the exploring unit along the well bore.

In the preferred form the sealing material is a diaphragm, the peripheral portion of which is secured to the outer surface of the ribs so as to present a continuous, smooth sealing surface for contact with wall structure of the bore hole. The opposite end of the diaphragm is secured to structure disposed within the confines of the rib-assembly with the remaining portion of the diaphragm enclosed by the rib-assembly. With the ribs on the outside of the diaphragm the folding of the diaphragm is facilitated as the ribs are moved from an unfolded position to a folded position.

For further objects and advantages of the invention and for an explanation of the construction of preferred embodiments of the invention, reference is to be had to the following detailed description taken in conjunction with the accompanying drawings, in which:

Fig. 1 illustrates an exploring unit disposed in a well bore;

Figs. 2, 3 and 4 diagrammatically illustrate the flow diverter in three different positions;

Fig. 5 is a sectional view of a part of the flow diverter of Fig. 1 associated with the exploring unit thereof;

Figs. 6, 7 and 8 are fractional sectional views taken respectively along the lines 6—6, 7—7 and 8—8 of Fig. 5;

Fig. 7A is an exploded view of parts of a sub-assembly of Figs. 5 and 7;

Fig. 9 is a sectional view taken along the line 9—9 of Fig. 5;

Fig. 10 is a sectional view of a fractional part of the flow diverter including the lower end illustrated in Fig. 5 and a part of the structure extending therebelow;

Fig. 11 is a sectional view illustrating the remainder of the flow-diverting mechanism;

Fig. 12 is a sectional view of a modification suited for uphole flow of fluid and including flow measuring means;

Fig. 13 is an enlarged fractional view of Fig. 12; and

Fig. 14 is a circuit diagram of a suitable control system.

Referring to Fig. 1, there is illustrated in a well bore 10 an exploring unit 11 embodying the present invention and in a position for measurement of flow of fluid as from the strata above a flow diverter 12 downwardly of the well bore 10. Where the exploring unit 11 is to be employed to measure fluid flow within a given section of bore hole and thus to determine fluid flow into or out of the section, a second flow diverter 13 may be provided. The exploration or metering unit 11 as a whole is supported from the earth's surface by any suitable means, such for example, as a cable 14. The cable extends through the well casing 15 and is attached to an upper supporting member 16 through which extend electrical conductors (not shown) leading to a motor disposed within the lower section 17 of the flow-measuring unit.

It will be seen that with flow-diverting elements 12 and 13 of the open conical type, any movement of the unit 11 along the bore hole will be likely to damage the flow-diverters since the tendency will be for one of them to dig into the wall of the well bore and to be engaged by any projections or any unevenness likely to be present. If the flow diverters 12 or 13 be damaged, and it becomes necessary to withdraw the unit 11 from the bore hole to replace them, valuable time is lost and the continuity of any particular survey of the well bore is lost.

In accordance with one aspect of the present invention, each flow diverter is arranged to be enclosed within a protective casing or housing during movement of the unit 11 along the well bore; the contraction and expansion of each well diverter being under the positive control of an operating element or motor forming a part of the unit.

In Fig. 2 the flow diverter 12 is shown as wholly enclosed within a protective tube or housing 18. Since the housing 18 may be of metal or other abrasion-resistant material and completely encloses the flow diverter particularly during movement of the unit 11 through the well bore, the flow diverter itself has a long life and one which is not shortened by tearing or abrasion against the sides of the well bore. When the exploring unit 11 is positioned at a desired depth, the motor within the section 17 is energized for rotation of a shaft 20 in a direction to withdraw the protective housing 18 from around the diverter 12.

As the housing 18 fully exposes the flow diverter 12, as shown in Fig. 3, a driving connection between the housing 18 and pins 21 and 22 of an actuating element is effected to expand the flow diverter 12 to the position shown in Fig. 4 and toward contact with the walls of the well bore. The flow diverter 12 itself comprises a plurality of ribs covered by a fluid-impervious material, such for example, as the plastic sold under the trademark "Neoprene." This flexible covering 29 fills with liquid tending to move downhole and any resultant movement of the diverter is in a direction to further expand it outwardly against the wall of the well bore and into fluid-tight engagement therewith.

Thus, liquid tending to flow downwardly of the well bore is constrained for passage through inlet ports or openings 25 circumferentially disposed around the elongated tubular central member 26, through a flow channel within which there is located the metering device (not shown) and thence to outlet ports or openings 23. The device for measuring the rate of flow of fluids, particularly liquid, within the bore hole may consist of a resiliently supported element movable by different amounts in accordance with the rate of flow to adjust a core relative to coils energized by way of the cable conductors. Any arrangement for producing output voltage proportional to flow will be suitable, and devices like those shown in copending application Serial No. 477,375, filed by John K. Godbey, December 23, 1954, will be satisfactory.

The diverter 12, Fig. 3, includes a circular array of ribs 27, providing primary supporting structure, pivoted on a ring 28 supported by a member 35, which is mounted on the periphery of tubular member 26. Intermediate the ends of each rib 27 there is pivotally secured one end of a strut 30 which is at its lower end pivotally connected by a ring 31 to an actuating member 32. Thus, as the housing 18 is moved downwardly to initiate movement of the pins 21, they cause the actuating member 32, connected thereto, to move downwardly. As the ring 31 is lowered, the struts 30, providing secondary supporting structure, pull downwardly on the ribs 27 and thus move them to the open position illustrated in Fig. 4.

A flexible diaphragm 29 is supported at its upper end by ribs 27. Diaphragm 29, which is tubular, comprises an upper section 29a which is a short cylinder of a flexible material such as "Neoprene" molded to the outside of ribs 27. The lower portion 29B of diaphragm 29 comprises a truncated, conical section of flexible material such as "Neoprene" impregnated, nylon fabric. The lower portion 29b is pierced by ribs 27 as to extend inside the ribs 27 and along tubular member 26 where it is clamped to the periphery of the tubular or frame member 26 as by a ring clamp 29c. With the ribs extended into an open position, the diaphragm 29 is expanded to contact the surface of an adjacent bore hole wall or well casing, as the case may be, completely to close the bore hole or casing to flow except as permitted through suitable ports 25 in the tubular member 26.

With the upper section or peripheral portion 29a of the diaphragm 29 molded to the outside surfaces of the ribs 27 there is presented for intimate contact with wall structure of the well bore a continuous, smooth surface which facilitates the attainment of a complete circumferential seal of the bore hole. While the remaining portion of the diaphragm may extend along the outside of the ribs 27, it is preferred that the above described construction be carried out in order to facilitate the folding of the diaphragm when the ribs 27 are moved from an open position to a closed position.

If the rotation of the shaft 20, Fig. 4, be reversed to move the housing 18 upwardly, the upper end thereof, which has a tapered opening as best appears in Fig. 5, engages the struts 30 to initiate the collapsing or closing of the umbrella-like flow diverter. The final closing of the flow diverter is accomplished by continued reverse movement of the actuating member 32 now upon engagement of the pins 21 and 22 by the lower end of slots within the housing 18.

With the above understanding of the invention, reference will now be made to further details of construction of the flow diverter 12 as appearing in Figs. 5-11.

The lower end of the upper supporting member 16 has a cylindrical portion 16a of reduced diameter and to which there is secured, as by a set screw 34, the tubular member 26. The ribs 27, disposed within or enclosed by the housing 18, are pivoted at their lower ends by the ring 28 carried by a subassembly 35, 36 which is itself secured to the tubular member 26 as by the set screws 33 and 33a.

This sub-assembly 35, 36, as shown in Figs. 6 and 7, includes an outer cylindrical member 35 having its upper end slotted as shown in Fig. 7A and each provided with a semi-circular groove 35a to receive the ring 28 after the lower ends of the ribs 27 have been threaded thereon. With the lower end of each rib nesting within one of the slots, a second cylindrical member 36 is moved onto the member 35. The member 36 has a slotted flange with each projection having a semi-circular slot 36a. These projections nest between the lower ends of the ribs 27 and engage and hold the ring 28 in place. The cylindrical members 35 and 36 are held together in a single relation by the screws 33 and 33a (Fig. 5), a number of them being provided in circumferential array about the members 35 and 36.

As shown in Fig. 5, the ribs 27 at their upper ends are flat, thin, and relatively flexible. The lower portions of the ribs are relatively stiff by reason of their channel shape. As shown in Fig. 1, the flexibility of the upper ends of the ribs 27 permits more than a line contact of the diaphragm 29 with wall surfaces of the bore hole. The flexibility of the ribs 27 also permits complete closure of a bore hole even under conditions where the bore hole cross-section is of irregular configuration. For example, should the diverter be positioned adjacent a section of bore hole having a wall portion extending closer to the diverter than other wall portions the rib adjacent the wall portion upon contact therewith will flex and thus permit continued movement of the remaining ribs into engagement with adjacent wall structure of the bore hole. The sealing is made complete upon expansion of the "Neoprene" fabric into area contact with the well bore as contrasted with point contact thereof as by the ends of the ribs 27. Each rib 27 at an intermediate portion thereof has pivotally secured thereto the upper end of a strut 30. As shown in Fig. 6, short pivot pins 37 extend through the U-shaped ears 30a of struts 30 and through the channel-shaped mid-sections of ribs 27.

The lower ends of the struts 30 are mounted on a sub-assembly 38, 39 of construction substantially identical with that illustrated in Fig. 7A. This sub-assembly forms actuating member 32. Thus, the sub-assembly for the ring 31 onto which are threaded the lower ends of struts 30 includes an inner cylindrical member 38 having the outwardly extending slotted flange cooperating with the slotted upper end of the outer cylindrical member 39, the two members being secured together by screws, not shown but similar to the screws 33, 33a of the sub-assembly 35, 36. In addition, two screws 40 and 41 have inward cylindrical extensions 40a and 41a nesting within elongated slots provided in the member 26.

The sub-assembly comprising the members 38 and 39 is axially slidable along the inner tubular member 26, the upper and lower ends of the elongated slots 26a and 26b predetermining the extent of movement of the sub-assembly which forms the actuating member 32. Actuation of the sub-assembly 38, 39 is accomplished by axial movement of the housing 18 which has two long slots 18a and 18b into which there projects the pair of actuating pins 21 and 22. Thus, as housing 18 is moved downwardly, from a position viewed in Fig. 5, the folded assembly including the ribs 27 is progressively uncovered. When the upper ends of the slots 18a and 18b engage the actuating pins 21 and 22, the assembly 38, 39 is moved in a downward direction. Since the ribs 27 are pivoted by the stationary ring 28, the downward movement of the struts 30 act through the pivot pins 37 to rotate the ribs outwardly to unfold the flexible covering 29, Fig. 4, for movement toward adjacent walls of the bore hole and to expose the inlet ports 25.

The downward movement of the cylindrical housing 18 is accomplished by rotation of a threaded shaft 20, Fig. 10, which carries a traveling nut or carriage 46 with pins 47 and 48 extending through slots 26d and 26e of the tubular member 26 and into driving relation with a cylindrical driving member 49. The lower end of the housing 18 is secured to the driving member 49 as by a series of screws 50. Thus the shaft 20 upon rotation in the proper direction moves the nut or carriage 46 downwardly as viewed in Fig. 10, and through the drive member 49 produces the downward movement of the housing 18.

The shaft 20 has its upper end journaled in a bearing member 51 carried by a block 52 having a press fit within the tubular member 26. Additional bearing means for the shaft 20 have been illustrated at 53 and 54, the latter being of the ball bearing type. The bearing assembly 54 is supported within a bearing block 55 having a circumferential groove in which there is disposed an O-ring seal 58 providing a fluid-tight connection between the bearing block 55 and an outer tube 56 of the lower section 17. The outer tube 56 is of fairly large cross-section to provide the needed strength. An inner groove of the bearing block 55 is provided with an O-ring 57 to prevent ingress of fluid into the bearing assembly 54. The lower end of the shaft 20 has a square end 20a nesting within a square opening in an extension shaft 60. This shaft at its opposite end, Fig. 11, is secured as by a drive pin 61 to a shaft 62 of a gear reducer 63. The input shaft 64 of the gear reducer 63 extends into driving engagement with a coupling member 65 which is preferably of rubber or other material providing a certain amount of flexibility. The coupling 65 may also be made of metal and may comprise a universal joint. Also in driving connection with the coupling 65 is the motor shaft 66 of the driving motor 67 supported by the mounting screws 68 from a frame member 69 suitably secured as by a press fit with a tube 70 disposed within the heavier outer tube 71.

To provide the necessary fit to the exploring unit as a whole, there is threaded to the outer member 71 a relatively long extension 73 which may be of lead. The upper end of the member 73 is provided with a peripheral recess in which there is disposed an O-ring 74 to seal the motor chamber from fluids within the well bore. It will be observed the tubular member 70 has a slot near its upper end into which extends a pin 75 to prevent rotation of the member 70. An O-ring 72 is provided between the upper end of the member 71 and the lower end of the tube 56. The tube 56 and member 71 are mechanically interlocked by one or more pins 77.

With the above understanding of the construction and operation of the preferred embodiment of the invention it will be understood, of course, that many variations may be made within the scope of the appended claims. For example, it is understood from the above description that flow measurements may be made with an exploring unit having a flow meter and including but a single one of the flow diverters, for example, the diverter shown in Figs. 2–11. In such an arrangement the measurement described is of downhole flow. Where uphole flow is to be measured and a single diverter employed the diverter will face downhole. Thus the wide end thereof will be upstream of its closed end and will face the direction of flow of the liquid.

There are occasions when more than one flow diverter will be desirable in order to isolate the flow to or from a selected strata. For example, where there is a relatively high rate of flow from the strata into the well a flow diverter located downhole of the strata may seal the bore hole against downward flow of liquid. A second flow diverter above the strata will form a seal assuring flow of the liquid through the metering device associated therewith for measurement of the flow from the selected strata. In the foregoing case where the fluid pressure at the strata is greater than the fluid pressure elsewhere in the well bore the open ends of the flow diverters face each other and the strata is isolated from the effects of flow from the other parts of the well bore. Where the flow from the isolated strata is not sufficient to maintain seals between the flow diverters and adjacent wall structure of the well bore, i.e., the fluid pressure tending to produce uphole flow is greater below the strata to be isolated, the downhole flow diverter should then face downwardly and toward the direction of flow to isolate the strata from the effects of the uphole flow. Thus, flow at a lower rate from the isolated strata will be metered at the location of the uphole diverter. The foregoing is sufficient to suggest the adaptability of the present invention to well bore flow conditions of widely differing character.

In Fig. 1 the separation distance between the flow diverters 12 and 13 is rather substantial and though there is no limitation on the separation distance, a pair of flow diverters will ordinarily be located sufficiently close to each other so as to permit the use of a single actuating shaft for simultaneously opening and closing the two diverters. In such a case it will be appreciated that right-hand threads and left-hand threads will be provided on the shaft respectively in association with the actuating means 32, 32a which actuate the flow diverters. In addition, it will be observed that the second flow diverter 13 (Fig. 1) is without the inlet ports 23 and 25 shown in conjunction with the flow diverter 12 (Fig. 3). The flow diverter 13 in the illustrated embodiment serves with flow diverter 12 to limit the flow of fluid measured by the instrument to that flowing into or out of the formation bounded by the flow diverters.

Upon energization of the motor 67 to rotate the shaft 20 in a direction to move the nut or carriage 46 upwardly, it will be observed that the upper end of the housing 18 will be moved upwardly first to engage the sides of the struts 30. By thus pressing them inwardly, the struts and ribs are moved from their outermost positions into the region of smaller cross-section of the assembly. As the enclosing housing 18 continues its upward movement, the parts eventually are moved back to the positions illustrated in Fig. 5 with the inlet and outlet ports covered by the housing; the inlet port being covered by both the housing and the diaphragm, and with the flow diverter fully protected against abrasion and undue wear during subsequent travels up and down the well bore to the various positions where measurement of flow of fluid within the well is to be undertaken.

For maximum clarity in the several sectional views, the conductors have for the most part been omitted. It is to be understood that they are included in the cable 14, and as shown in Fig. 5, they are disposed in an opening extending through the supporting member 16. These conductors 79 also appear in Fig. 9 and are there disposed within a groove extending lengthwise of the frame member 26. The insulated conductors are held in the groove by "potting" or other insulating material which maintains them below the outer surface of the member 26.

As exemplary of a further modification, reference is now to be had to Fig. 12 which is particularly suited for measurement of uphole flow of fluid.

In Fig. 12 the threaded shaft 20 is driven by the motor drive assembly of Fig. 11 in manner earlier described. However, in the modification of Fig. 12 the threaded nut or carriage 46 with its drive pins 47 and 48 extending through the slots 26d and 26e of the member 26 engage the assembly 38, 39 which is slidable along the member 26 for actuation through the struts 30 of the ribs 27 to and from a folded position adjacent a region of smaller cross-section of the tubular member 26. Like the preceding arrangement, the actuating means including carriage 46 and drive pins 47 and 48 is of smaller diameter than the largest diameter of the tubular member as exemplified in Fig. 12 by flow tube 80. Flow tube 80 has inlet openings 81 and outlet openings like those shown in Fig. 5. The ribs 27 are pivoted in a stationary assembly 35, 36 secured as by screws 34 to an inner member 84 connected to the flow tube 80 which extends uphole and terminates in a supporting member, not shown, but similar to that of the member 16 of Fig. 5. The ribs 27 are covered with a diaphragm or covering 29, Fig. 13, which may be of Neoprene impregnated nylon. The cover 29 is bonded at one end to a recessed portion of the member 35. With the flow diverter in its unfolded position, the inlet ports or openings 81 are exposed. Fluid flowing in an uphole direction develops a pressure against the diaphragm or covering 29, carried by the ribs 27, Fig. 13, and forms a fluid-tight seal against the wall of the well bore. Thus, all upwardly flowing fluid is directed through the plurality of openings 81 of a connecting member 82 secured at one end to, or formed integrally with, a plug 83 secured by screws within the frame member 26. The opposite end of the connecting member 82 is secured to, or formed integrally with, the inner member 84 to which the flow tube 80 and the assembly 35, 36 are secured.

Within the flow tube 80 any suitable flow measuring device may be incorporated. For example, it may comprise a magnetic core 85 resiliently supported by spring 86 with a relatively large vane 88 disposed partly across the flow channel within tube 80. Thus, the position of the core 85 relative to three coils 89, 90 and 91 will produce an output voltage proportional to the rate of flow of fluid, particularly liquid, through the flow tube 80.

In Fig. 14 there is illustrated a simplified schematic diagram of a system suitable for measurement of fluid flow and for the actuation of the flow diverter under control of an operator at the earth's surface.

A cable 14 having an inner conductor 79a represents the supporting system and the electrical circuit between the uphole or surface system 100 and the down-hole bore hole system 101. A source of power 102 suitably isolated from a generating system as to permit it to be grounded at terminal 102a is coupled by way of auto-transformer 103 to an A.C. milliammeter 104 and thence by way of fuse 105 and condenser 106 to a conductor 107 leading to a fixed terminal or contact 108 in the first section of a two pole, three position selector switch 109. Ground terminal 102a is also connected by way of conductor 110 to a movable contact or selector arm 111 of the second section of the selector switch 109. Conductor 110 is also connected to the shield conductor 79b of the cable 14 leading to the bore hole unit 101. With the movable contacts or arms of selector switch 109 in the center switch position, alternating current from source 102 is fed to the bore hole unit 101 to actuate the measuring means which produces on the circuit-channel comprising shield 79b and inner conductor 79a a signal representative of flow-dependent forces on the sensing element 112. While the downhole system may be of any suitable type, the preferred system shown in Fig. 14 is of the type described in detail in applicant's aforementioned copending application, for Measurement of Fluid Flow Dependent Forces. Briefly, an A.C. potential is applied to coil 113 to set up a magnetic field adjacent the sensing element 112 and coil 119. The circuit may be traced from the source 102 by way of conductor 79a, switch contacts 114, 115, conductor 116, capacitor 117, conductor 118, coil 113 and thence to ground which is the other side of source 102. The element 112 moves in response to the rate of fluid flow through the member 26 (Fig. 5), and varies the potential induced in winding or coil 119. The A.C. potential induced into winding 119, representative of the rate of fluid flow, is rectified by rectifiers 120, 121 and conducted uphole by way of conductors 116, 79a and 107. The magnitude of the rectifier signal is detected, measured and/or recorded by a suitable measuring and/or recording system 122 positioned at the surface and responsive to the flow controlled signal. The measuring system 122 may include a self-balancing electronic recorder of the type described in U.S. Patent 2,657,349, issued to A. J. Williams. Such a recorder is sold under the trademark "Speedomax."

Provision is also made in the system of Fig. 14 to actuate the motor 67 selectively to open and close the flow diverter shown in detail in the preceding drawings. More particularly, it is to be noted that conductor 79a is connected to the armature or movable contact 114 of a relay controlled switch whose first fixed contact 115 is connected to the flow measuring system. Closure of contact 114 with contact 115 represents the normal position of the relay or switch. A relay actuating coil 123 is connected at one terminal to conductor 79a and at the other terminal to a resistor 124 which in turn is connected to a ground terminal and to the outer shield 79b. The relay comprising coil 123 and contact 114 is of the type which will be energized by a D.C. potential and will not be responsive to an A.C. potential. Upon energization of coil 123 armature 114 is moved to the second relay contact 115a. Contact 115a is connected by conductor 125 to a D.C. motor 67. By controlling the polarity of the D.C. potential applied between conductors 79a and 79b, the motor 67 may be driven in either direction.

The surface control system for motor 67 comprises a source 126 of direct current connected by way of a D.C. milliammeter 127 to terminals 128 and 129. Sourse 126 is also connected by way of a fuse 130 to terminals 131 and 132 of the selector switch 109. Thus it will be seen that with the movable contacts of selector switch 109 in either the left-hand or the right-hand position a D.C. potential will be applied to the relay 123 to effect its energization and to move contact 114 into engagement with fixed contact 115a. Accordingly, there will be applied to the actuating motor 67 a voltage to drive the motor 67 in one direction or another depending upon the polarity of the applied D.C. voltage. The polarity is changed by a suitable polarity reversing means, which in the present embodiment is provided by the selector switch 109. With the movable contacts of selector switch 109 in a left-hand position a voltage of one polarity will be applied to drive the motor in a direction, for example, to open the flow diverter. On the other hand, with the movable contacts of selector switch 109 moved to the right-hand position a voltage of opposite polarity will be applied to the motor 67 to drive it in an opposite direction so as to close the flow diverter.

It will be noted that upon actuation of the selector switch 109 from the illustrated center position, the source of alternating current 102 and the measuring system 122 are disconnected from cable 14.

In accordance with another aspect of the present invention there is provided a means for deenergizing the motor 67 upon the arrival of the diverter or diverters in a full open or full closed position. Accordingly, the motor is deenergized when the diverter or diaphragm is opened to a position engaging walls of the bore hole and also deenergized when the diverter or diaphragm is folded and completely encased by the housing 18. The deenergizing means is provided by a current-responsive device such as a circuit breaker which may be incorporated with a milliammeter. Such an instrument has been illustrated as the milliammeter 127.

The circuit breaker is responsive to the magnitude of D.C. current flowing from the source 126. When the diverter is freely movable the current will be at a predetermined operating level. However, as soon as the diverter movement is halted as, for example, by contact of wall structure with the bore hole, an increased load is placed on the motor 67 as it attempts to effect continued movement of the diverter. The current drawn from the source is increased beyond the normal predetermined level and the circuit breaker thereupon responds to deenergize the motor.

The condition or state of the circuit breaker will be an indication to an operator of either of two conditions or states of the diverter, i.e., opened or closed, so that he may then either throw switch 109 to begin a flow measuring cycle or begin the movement of the exploring unit 11, Fig. 1, to another position within the bore hole.

In addition to providing a means for deenergizing the motor 67 upon attainment of the diverters of a full-opened position or full-closed position the circuit breaker also provides a protecting means responsive to abnormal load increases to open the load circuit and thus prevent damage to any of the system components.

A suitable milliammeter and circuit breaker may be of the type manufactured and sold by Assembly Products, Inc. of Chagrin Falls, Ohio, and designated as Model 351–C Contact Meter. A meter having a range of zero to 300 milliams. D.C. and set to open the circuit at 100 milliams. has been employed with a driving motor designed to draw a normal load current of slightly less than 100 milliams.

What is claimed is:

1. A flow diverter for the measurement of fluid flow within a well bore comprising a central frame member having a flow channel therein and provided in the region of the upper end thereof with a first opening communicating with said flow channel and in the region of the lower end thereof a second opening communicating with said flow channel, an assembly of ribs and struts supported in circular array by said central member, structure pivotally interconnecting said ribs and struts, said struts being connected, one to each rib, at points intermediate the ends of said ribs, means for pivotally connecting one end of each of said ribs to said central member intermediate said first and second openings, a traveling nut assembly including a nut supported on a threaded shaft, means pivotally interconnecting one end of each of said struts to said traveling nut assembly, a motor supported by said central member and connected to said shaft for rotating said shaft to move said nut toward and away from one of said openings for actuating said ribs and said struts to extended positions with the free ends of said ribs disposed against the walls of said well bore and to a folded position respectively, and fluid-impervious material carried by said ribs for directing well bore fluid flow into said flow channel by way of one of said openings when in said extended positions.

2. In a flow measuring system for determining the fluid flow into or out of a strata of a well bore the combination which comprises an elongated member having a flow channel with an inlet port and an outlet port at spaced points, a pair of flow diverters spaced along said elongated member, each of said flow diverters comprising a flexible diaphragm secured at one end to the exterior of said member, one end of one of said flow diverters being secured to said elongated member at a point intermediate said ports, one of said ports being located between said flow diverters, opening and closing structure for each diaphragm including ribs pivotally secured to said member at corresponding ends, struts pivotally connected to said ribs intermediate the ends thereof, an actuating member slidable on said elongated member and operatively connected to said struts, driving means coupled to each of said actuating members of said opening and closing structures for moving said structures and said diaphragms from closed positions toward open positions for engagement of the peripheries of said diaphrams with wall structure of said well bore to seal off the selected strata of well bore from the rest of the well bore and to direct flow of fluid by way of said inlet port and said flow channel to said outlet port, and control means at a surface location connected to said driving means for controlling the energization of said driving means for selectively operating said opening and closing structures.

3. In a flow measuring system for measuring fluid flow into or out of a strata of a well bore, the combination which comprises an elongated member having a flow channel with an inlet port and an outlet port at spaced points, a first flow diverter mounted on the outside of said elongated member, a second flow diverter mounted on said elongated member at a point spaced from said first flow diverter and beyond said inlet and outlet ports, said second diverter being adapted to seal off said well bore and for cooperating with said first diverter to define the strata of the well bore, each of said diverters comprising a flexible diaphragm secured at one end to the exterior of said elongated member, said diaphragm of said first diverter having its one end secured to said member at a point intermediate said ports, one of said ports being located between said flow diverters, opening and closing structures for said diverters including ribs pivotally secured to said member at corresponding ends, struts pivotally connected to said ribs intermediate the ends thereof, an actuating member slidable on said elongated member and operatively connected to said struts, driving means coupled to each of said actuating members of said opening and closing structures for moving them from a closed position toward an open position to unfold said diaphragms to engage the walls of said well bore and to effect fluid-tight seals defining therebetween said well bore strata, and control means at a surface location connected to said driving means for controlling the energization of said driving means for selectively operating said opening and closing structures.

4. A flow diverter for the measurement of fluid flow within a well bore comprising a central member having a flow channel therein with longitudinally spaced openings therein forming an inlet port and an outlet port, an assembly of ribs and struts disposed in circular array around said central member, structure for pivotally connecting said ribs to said struts with each strut connected to a rib at a point intermediate the length of said rib, structure for pivotally connecting one end of each of said ribs to said central member at regions adjacent to said inlet port and between said inlet port and said outlet port, an actuating member pivotally connected to one end of each of said struts, a diaphragm of fluid impervious material carried by said ribs with a portion of said diaphragm adjacent the free ends of said ribs being secured to the outer surface of said ribs, the remainder of said diaphragm being disposed adjacent the inner surface of said ribs with an end of said diaphragm secured to the exterior of said central member, and an enclosing housing disposed about said central member for movement longitudinally thereof and into a covering position relative to said truts, said ribs and said diaphragm and for longitudinal movement in an opposite direction to uncover them, and driving means coupled to said actuating member operable after movement of said enclosing housing to a position uncovering said ribs, said diaphragm and said struts for actuating said ribs and said struts to an unfolded position wherein the free ends of said ribs bring said adjacent portion of said diaphragm into fluid-tight sealing relation with a wall of the bore hole.

5. A flow diverter for the measurement of fluid flow within a well bore comprising an elongated member having extending therethrough a flow channel with inlet and outlet openings spaced one from the other axially along said member, a flexible tubular diaphragm having a truncated cone-shaped section, means for securing the smaller-diameter end portion of said truncated section to the exterior of said member intermediate said openings, a primary supporting structure including a plurality of ribs disposed in circular array about said member and pivotally secured thereto at one end of each rib and extending lengthwise of said diaphragm at least to the peripheral region of greater diameter, secondary supporting structure for said primary supporting structure including a plurality of struts each pivotally connected at one end to one of said ribs at a point intermediate the ends of each rib, an actuating member slidably supported on said elongated member, pivotal means inter-connecting said actuating member and one of the ends of each of said struts remote from said ribs, an elongated tube slidably mounted on said elongated member of a size for encompassing said diaphragm and said supporting structures when in folded positions adjacent said elongated member thereby to provide a protective housing for them, a driving connection between said elongated tube and said actuating member, driving means coupled to said actuating member for moving said tube from a position encompassing said diaphragm and said structures to a position removed therefrom, said driving means as said elongated tube is removed from said diaphragm effecting through said driving connection unfolding movements of said secondary supporting structure and of said primary supporting structure for outward movement of said diaphragm, and means for controlling the operation of said driving means.

6. A flow diverter for the measurement of fluid flow within a well bore comprising a central member having a flow channel extending lengthwise thereof with inlet and outlet means spaced one from the other, an assembly of ribs disposed in circular array around said central member and between said inlet and outlet ports, pivotal means for pivotally connecting one end of each of said ribs to said central member, an assembly of struts disposed in circular array around said central member, one end of each of said struts being pivotally connected to one of said ribs intermediate the ends thereof, driving means including an actuating member carried by said central member and axially movable therealong, pivotal means for pivotally connecting to said actuating member the end of each of said struts remote from the ends pivotally connected to said ribs whereby movement of said actuating member in one direction rotates said ribs outwardly from said central member to an unfolded position and upon movement of said actuating member in the opposite direction rotates said struts and said ribs toward said central member to a folded position, an enclosing housing disposed about said central member and axially movable from a position enclosing said struts and said ribs to a position to uncover them, said driving means including a driving connection with said enclosing housing for moving it to said position uncovering said ribs and said struts and for thereafter operating said actuating member to move said ribs and said struts to said unfolded position for disposition of the ends of said ribs remote from their pivoted ends against a wall of the well bore, and fluid-impervious material carried by said ribs to form a seal about the wall of the well bore and for directing the flow of fluid within the well bore into said inlet means for flow through said flow channel and outwardly thereof through said outlet means.

7. The flow diverter of claim 6 in which said housing has a tapered opening at one end for engaging said struts to move them toward said central member and to move said ribs and said fluid-impervious material toward a folded position, said ribs in said folded position extending in a direction away from the ends of said struts pivotally connected to said actuating member whereby said housing upon continued movement thereof effectively encloses said struts, said ribs and said fluid-impervious material.

8. A flow diverter for the measurement of fluid flow within a well bore comprising a central member having a flow channel with inlet and outlet means, an assembly of ribs and struts disposed in circular array around said central member, structure for pivotally interconnecting said ribs and said struts, one end of each of said struts being connected to one of said ribs at a point intermediate the ends thereof, structure for pivotally connecting one end of each of said ribs to said central member, a traveling nut assembly including a threaded shaft, an actuating member coupled to said traveling nut assembly, structure pivotally connecting the other end of each of said struts to said actuating member, a motor for rotating said shaft for moving said actuating member toward and away from said pivoted ends of said ribs for actuating said ribs and said struts between folded and unfolded positions, the free ends of said ribs being disposed against a wall of the well bore when said assembly is unfolded, and fluid-impervious material carried by said ribs and extending from the wall of the well bore to said central member when said assembly is unfolded for directing flow of well bore fluid into said flow channel by way of said inlet means.

9. A flow diverter for the measurement of fluid flow within a well bore comprising a central member having a flow channel with spaced apart inlet and outlet openings, an assembly of ribs and struts disposed in circular array around said central member, structure for pivotally interconnecting said ribs and said struts, one end of each of said struts connected to one of said ribs at a point intermediate the ends thereof, structure for pivotally connecting one end of each of said ribs to said central member at a region intermediate said inlet and outlet openings, a traveling nut assembly including a threaded shaft, an actuating member coupled to said traveling nut assembly, structure pivotally interconnecting the other end of each of said struts to said actuating member, a motor carried by said central member for rotating said shaft for moving said actuating member toward and away from said pivoted ends of said ribs for actuating said ribs and said struts between folded and unfolded positions, the free ends of said ribs being disposed against a wall of the well bore when said assembly is unfolded, uphole means for controlling the energization of said motor for rotation in one direction or the other selectively to operate said actuating member to move said ribs and said struts between their folded and unfolded positions, uphole means operable when said ribs and said struts have attained one of their said positions for deenergizing said motor, and fluid-impervious material encircling said central member, said fluid-impervious material being at one end secured to said central member and from said secured end extending outwardly along said ribs for movement into fluid-sealing relationship with a wall of the well bore when said ribs reach their unfolded position for directing flow of well bore fluid into said inlet opening.

10. The flow diverter of claim 9 in which said deenergizing means is a current-responsive device responsive to the loading of said motor which occurs when said structure is in said folded position and when in said unfolded position.

References Cited in the file of this patent

UNITED STATES PATENTS

| Number | Name | Date |
|---|---|---|
| 1,647,630 | Hyer | Nov. 1, 1927 |
| 2,009,322 | Nelson | July 23, 1935 |
| 2,047,774 | Greene | July 14, 1936 |
| 2,080,736 | Nixon et al. | May 18, 1937 |
| 2,564,198 | Elkins | Aug. 14, 1951 |
| 2,629,446 | Freling et al. | Feb. 24, 1953 |
| 2,642,141 | Kolb | June 16, 1953 |

UNITED STATES PATENT OFFICE
CERTIFICATE OF CORRECTION

Patent No. 2,929,455                  March 22, 1960

John K. Godbey

It is hereby certified that error appears in the printed specification of the above numbered patent requiring correction and that the said Letters Patent should read as corrected below.

Column 1, lines 44 and 45, for "elonbated" read -- elongated --; line 56, for "or" read -- for --; column 3, line 52, for "29B" read -- 29b --; line 53, for "tuncated" read -- truncated --; column 8, line 13, for "rectifier" read -- rectified --; line 44, for "Sourse" read -- Source --; column 9, lines 33, 34, and 36, for "milliams", each occurrence, read -- milliamps --; line 67, after "spaced", second occurrence, insert -- apart --; column 10, line 57, for "fluid impervious" read -- fluid-impervious --; line 66, for "truts" read -- struts --; column 11, lines 17 and 18, for "interconnecting" read -- interconnecting --; column 12, line 50, after "their" insert -- said --.

Signed and sealed this 6th day of September 1960.

(SEAL)
Attest:

ERNEST W. SWIDER
Attesting Officer

ROBERT C. WATSON
Commissioner of Patents